US009576205B1

(12) United States Patent
Zackay et al.

(10) Patent No.: US 9,576,205 B1
(45) Date of Patent: Feb. 21, 2017

(54) METHOD AND SYSTEM FOR DETERMINING LOCATION OF AN OCCUPANT (71) Applicant: POINTGRAB LTD., Hod Hasharon (IL)

(72) Inventors: Ora Zackay, Hod Hasharon (IL); Jonathan Laserson, Tel-Aviv (IL); Gilboa Levy, Tel-Aviv (IL)

(73) Assignee: POINTGRAB LTD., Hod Hasharon (IL)

( * ) Notice: Subject to any disclaimer, the term of this patent is extended or adjusted under 35 U.S.C. 154(b) by 0 days.

(21) Appl. No.: 15/155,022

(22) Filed: May 15, 2016

Related U.S. Application Data (60) Provisional application No. 62/315,704, filed on Mar. 31, 2016.

(51) Int. Cl.
G06K 9/00 (2006.01)
G06T 7/00 (2006.01)
H04N 5/247 (2006.01)
G06K 9/62 (2006.01)

(52) U.S. Cl.
CPC ......... *G06K 9/00778* (2013.01); *G06K 9/6201* (2013.01); *G06T 7/0042* (2013.01); *G06T 7/0051* (2013.01); *H04N 5/247* (2013.01); *G06T 2207/30196* (2013.01)

(58) Field of Classification Search
None
See application file for complete search history.

(56) References Cited

U.S. PATENT DOCUMENTS

| 6,486,778 | B2 | 11/2002 | Mahler |
| 6,678,413 | B1* | 1/2004 | Liang ............... A61B 5/1113 348/169 |
| 8,228,382 | B2* | 7/2012 | Pattikonda ......... G06K 9/00228 348/169 |
| 2006/0227862 | A1 | 10/2006 | Campbell |
| 2009/0034791 | A1* | 2/2009 | Doretto ............... G06K 9/4647 382/103 |
| 2012/0051592 | A1* | 3/2012 | Yashiro ............... G06K 9/3241 382/103 |
| 2013/0259298 | A1 | 10/2013 | Srinivasan |
| 2014/0072170 | A1* | 3/2014 | Zhang ............... G06K 9/00369 382/103 |
| 2015/0178571 | A1 | 6/2015 | Zhang |

OTHER PUBLICATIONS

Hoiem et al., "Putting Objects in Perspective", International Journal of Computer Vision, vol. 80 pp. 3-15, Apr. 17, 2008.*

(Continued)

*Primary Examiner* — Jason Heidemann
*Assistant Examiner* — Brian Shin
(74) *Attorney, Agent, or Firm* — Daniel J. Swirsky; AlphaPatent Associates Ltd.

(57) ABSTRACT

A method and system for determining a location of an occupant in a space include detecting a shape of an occupant in an image of a space; determining a location of the occupant on a floor of the space in the image, based on the shape of the occupant; and transforming the location on the floor in the image to a location of the occupant on the floor in the space.

11 Claims, 9 Drawing Sheets

(56) References Cited

OTHER PUBLICATIONS

Teixeira, Thiago, "Lightweight People Counting and Localizing in Indoor Spaces Using Camera Sensor Nodes", 2007 First ACM/IEEE International Conference on Distributed Smart Cameras, Sep. 2007,pp. 36-43,IEEE, Vienna.

Kuan-Wen, Chen, "An Adaptive Learning Method for Target Tracking Across Multiple Cameras", IEEE Conference on Computer Vision and Pattern Recognition, Jun. 2008, pp. 1-8, IEEE, Anchorage, AK.

Nait-Charif, Hammadi, "Activity Summarisation and Fall Detection in a Supportive Home Environment", Pattern Recognition, 2004. ICPR 2004. Proceedings of the 17th International Conference on, vol. 4, pp. 323-326. IEEE, 2004. Harvard.

\* cited by examiner

METHOD AND SYSTEM FOR DETERMINING LOCATION OF AN OCCUPANT

CROSS-REFERENCE TO RELATED APPLICATIONS

This application claims priority from U.S. Provisional Patent Application No. 62/315,704, filed Mar. 31, 2016, the contents of which are incorporated herein by reference in their entirety.

FIELD OF THE INVENTION

The present invention relates to the field of crowd and space analysis using computer vision techniques. Specifically, the invention relates to locating occupants in a space.

BACKGROUND

The ability to detect and monitor occupants in a space, such as a room or building, enables planning and controlling home or building systems for better space utilization, to minimize energy use, for security systems and more.

Computer vision is sometimes used to analyze an imaged space and to detect occupants in the space. One or more cameras are usually employed to monitor a space or area. Typically, 3D cameras or 3D models of people are used to detect segmented bodies or blobs which may represent occupants in the imaged space and to analyze the space. In a multi camera setup, where several cameras are used to cover an area too large for a single camera, overlapping fields of view of the plurality of cameras causes ambiguity leading to inefficient and inaccurate analysis of the monitored space. This, and the need to use special (usually sophisticated) cameras and/or complex or heavy computation in order to reconstruct the imaged space to find positions of objects in the space, may be one of the impediments to wide-spread implementation of occupant monitoring systems in living and work spaces.

SUMMARY

Embodiments of the invention provide a method and system for determining a real-world location of an occupant or other objects in a space based on an image of the space.

In some embodiments the invention includes detecting a shape of an object in an image of a space. A physical point of interest related to the object may be determined from the detected shape and may be used in various applications such as analysis of the space, occupancy detection, crowd analysis and more.

In one embodiment the physical point of interest may be the point of location of the occupant or other object on the floor of the space. The location of the occupant (or object) on the floor of the space in an image may be determined from a shape detected in the image, typically a 2D or 3D shape detected from a 2D image. The location on the floor in the image is transformed to a real-world location and the real-world location may be used in analyzing the space and in occupancy detection and/or in crowd analysis.

In another example the physical point of interest may be a point related to the occupant's shape, for example, the tip of the occupant's nose or the occupant's shoulders. Information such as the direction of the occupant's gaze, may be learned from these physical points of interest.

Embodiments of the invention provide an accurate and computationally inexpensive method and system for determining the location of objects (e.g., occupants) and for counting objects (e.g., occupants) in a space and may be used in analyzing the space and in occupancy detection and/or in crowd analysis or other applications.

BRIEF DESCRIPTION OF THE DRAWINGS

The invention will now be described in relation to certain examples and embodiments with reference to the following illustrative figures so that it may be more fully understood. In the drawings.

DETAILED DESCRIPTION

Embodiments of the invention provide a method and system for determining occupancy in a space. "Determining occupancy" or "detecting occupancy" may include detecting an occupant and/or monitoring one or more occupants throughout the space e.g., counting occupants, tracking occupants, determining occupants' location in a space, etc.

"Occupant" may refer to any type of body in a space, such as a human and/or animal and/or inanimate object.

In embodiments of the invention a physical point of interest related to an occupant is detected from a shape of the occupant. The physical point of interest is then used to understand an imaged scene.

In one embodiment a method for determining occupancy in a space includes determining, based on a shape of the occupant, a location of the occupant on the floor of the space in an image of the space. The location on the floor in the image is then transformed to a real-world location (namely, the location on the floor of the space as opposed to the location on the floor in the image). Each real-world location thus calculated represents a single occupant. The number of real-world locations calculated in a space may then be used to count occupants in the space, e.g., for crowd analysis and more.

Figure 1A:
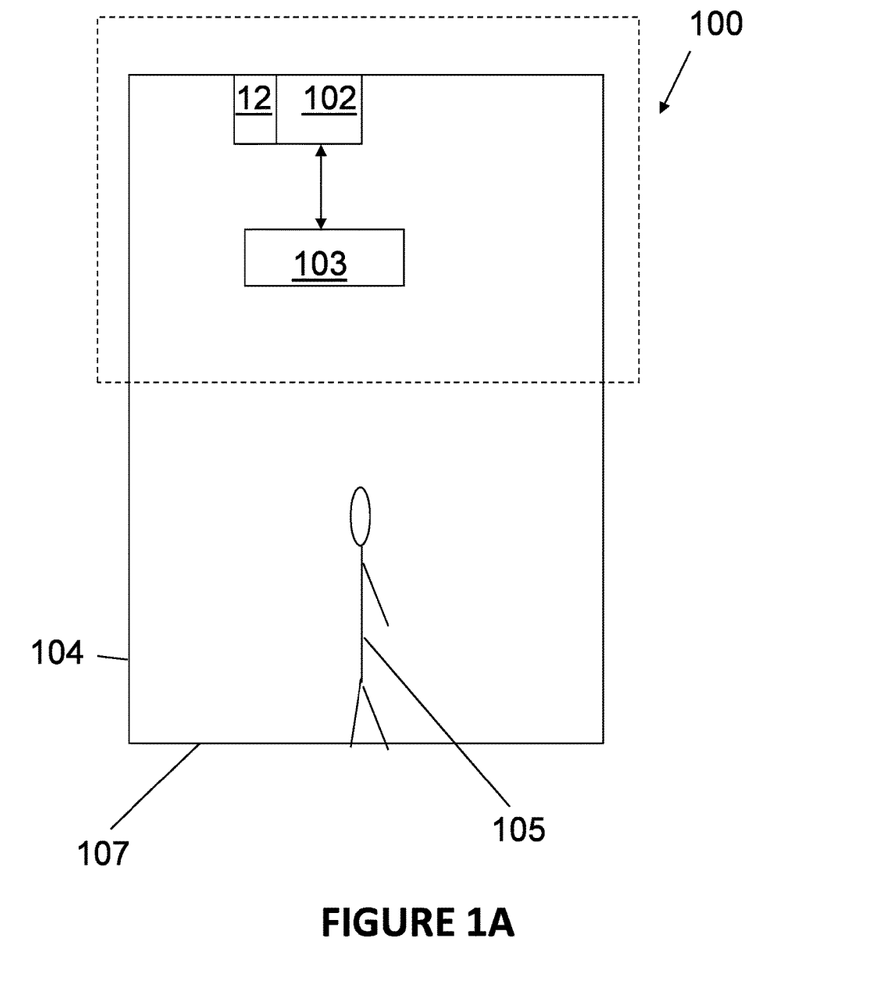
FIGS. 1A and 1B are schematic illustrations of systems operable according to embodiments of the invention.

An example of a system operable according to embodiments of the invention is schematically illustrated in FIG. 1A.

In the following description, various aspects of the present invention will be described. For purposes of explanation, specific configurations and details are set forth in order to provide a thorough understanding of the present invention. However, it will also be apparent to one skilled in the art that the present invention may be practiced without all the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment the system 100 includes an image sensor 103 which may be part of a camera monitoring a space such as a room 104 or portion of the room 104 and for obtaining images of an occupant 105 in the room 104. In one embodiment the camera is a 2D camera.

The image sensor 103 may be associated with a processor 102 and a memory 12. Processor 102 runs algorithms and processes to detect an occupant and to determine occupancy in the space based on input from image sensor 103. The processor 102 may output information or signals which may be used for controlling devices in the space, for counting occupants in the space, for monitoring occupants and more.

The processor 102 may be in wired or wireless communication with devices and other processors. For example, output from processor 102 may trigger a process within the processor 102 or may be transmitted to another processor or device to activate a process at the other processor or device.

A counter may be run by a processor to count occupants according to embodiments of the invention. The counter may be part of processor 102 or may be part of another processor that accepts input from processor 102.

Processor 102 may include, for example, one or more processors and may be a central processing unit (CPU), a digital signal processor (DSP), a microprocessor, a controller, a chip, a microchip, an integrated circuit (IC), or any other suitable multi-purpose or specific processor or controller.

Memory unit(s) 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Images obtained by the image sensor 103 may be analyzed by a processor, e.g., processor 102. For example, image/video signal processing algorithms and/or shape detection algorithms and/or machine learning processes may be run by processor 102 or by another processor and may be used to analyze images from image sensor 103.

According to some embodiments images may be stored in memory 12. Processor 102 can apply image analysis algorithms, such as known motion detection and shape detection algorithms and/or machine learning processes in combination with methods according to embodiments of the invention to detect occupancy in a space.

Typically, the image sensor 103 or camera is at a known distance from and in parallel to a surface such as floor 107 on which objects are located.

In one embodiment an image of the room 104 or part of the room obtained by image sensor 103 is analyzed by processor 102 to detect a shape of an object (e.g., occupant 105). "Object" may include rigid objects such as equipment or furniture in the room 104 (such as a desk, a chair, a bed, etc.) or non-rigid objects such as people. Throughout the specification "occupant" is used to exemplify embodiments of the invention however it should be appreciated that the description relates to typically mobile occupants (human, animal or inanimate objects such as vehicles) and other perhaps less mobile objects (such as furniture).

In one embodiment the shape of the object, e.g., occupant 105, is a 2D shape. Processor 102 then determines, from the detected shape of the occupant, the location of the occupant on the floor 107 of the space in the image. The location on the floor in the image is then transformed to a real-world location by processor 102 or by anther processor. The real-world location may be represented as a coordinate or other location representation.

Processor 102 may run shape detection/recognition algorithms to detect the shape of the occupant. For example, shape detection/recognition algorithms may include an algorithm which calculates features in a Viola-Jones object detection framework. In another example, the processor 102 may run a machine learning process to detect a shape of the occupant. For example, a machine learning process may run a set of algorithms that use multiple processing layers on an image to identify desired image features (image features may include any information obtainable from an image, e.g., the existence of objects or parts of objects, their location, their type and more). Each processing layer receives input from the layer below and produces output that is given to the layer above, until the highest layer produces the desired image features. Based on identification of the desired image features a shape of an object may be determined enabling the system to detect a shape of an occupant and/or object.

In one embodiment the image sensor 103 is configured to obtain a top view of a space. For example, a camera including image sensor 103 may be located on a ceiling of room 104 typically in parallel to the floor 107, to obtain a top view of the room or of part of the room 104. Processor 102 may run processes to enable detection of occupants, such as people, from a top view, e.g., by using rotation invariant features to identify a shape of a person or by using learning examples for a machine learning process including images of top views of people or other types of occupants.

In one embodiment the image sensor 103 is configured to obtain an image which include floor 107 or at least part of floor 107.

Processor 102 may use the shape of the occupant to determine the location of the occupant on the floor 107 of the space in the image by, for example, determining a projection of the center of mass of the occupant which can be extracted from the occupant's shape in the image, to a location on the floor 107. In another embodiment processor 102 determines the location of the occupant on the floor 107 in the image by identifying the feet of the occupant based on the detected shape of the occupant. The location of the feet in the image is determined to be the location of the occupant on the floor 107 in the image. These and other methods are further described below.

Processor 102 or another processor transforms the location on the floor 107 in the image to a real world location by using, for example, projective geometry.

Each real-world location essentially represents a single occupant. The real-world locations may be output by processor 102 and/or may be used, for example, to count occupants in the space. Thus, in some embodiments processor 102 is to determine a number of real-world locations and to determine a number occupants in the space based on the number of real-world locations.

In some cases a plurality of image sensors are used to monitor a space, each image sensor typically covering part of the space. A multi-sensor setup is schematically illustrated in FIG. 1B.

Image sensors 103a and 103b are typically positioned in room 104 so as to obtain a top view of the space of room 104, of the floor 107 and of occupant 105. The distance of the image sensors 103a and 103b from the floor 107 and from each other is usually known.

Figure 1B:
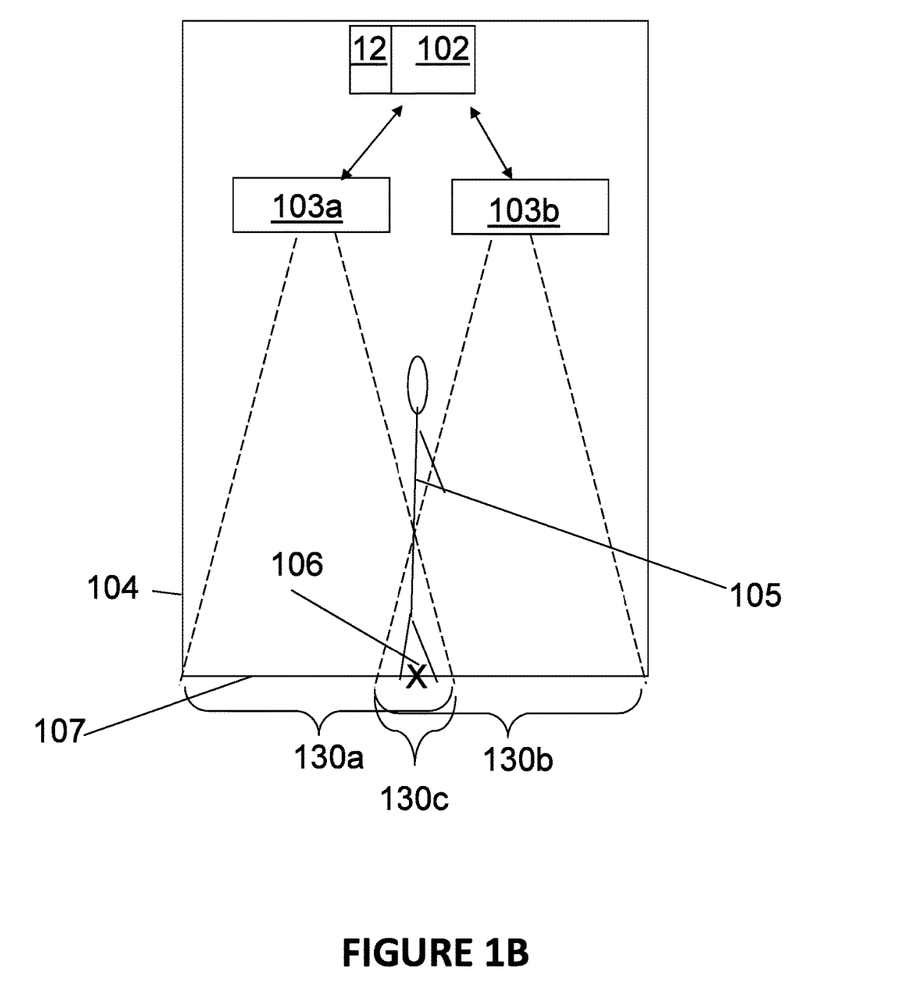

Image sensors 103a and 103b may each be in communication with a separate processor and/or memory or both may be in communication with a single processor 102 and memory 12, as illustrated in FIG. 1B.

Each of image sensors 103a and 103b has a field of view (FOV) (130a and 130b correspondingly) which covers part of room 104 and part of floor 107 however there is some overlap 130c between the FOVs. Occupant 105 positioned in the overlap 130c will be detected twice; once by image sensor 103a and once by image sensor 103b. However, even though the occupant 105 (or at least part of the occupant) is detected twice, there is only a single real-world location 106 for the occupant 105. The occupant's 105 location on the floor in the image obtained by image sensor 103a will be transformed, according to embodiments of the invention, to the real-world location 106 and the location of the occupant 105 on the floor in the image obtained by image sensor 103b will be transformed, according to embodiments of the invention, to the real-world location 106 thereby indicating that there is only one occupant in room 104.

In another example, processor 102 may match descriptors of the occupant 105 in the image obtained from image sensor 103a and descriptors of occupant 105 in the image obtained from image sensor 103b to determine that occupant 105 is the same occupant in both images.

Figure 3A:
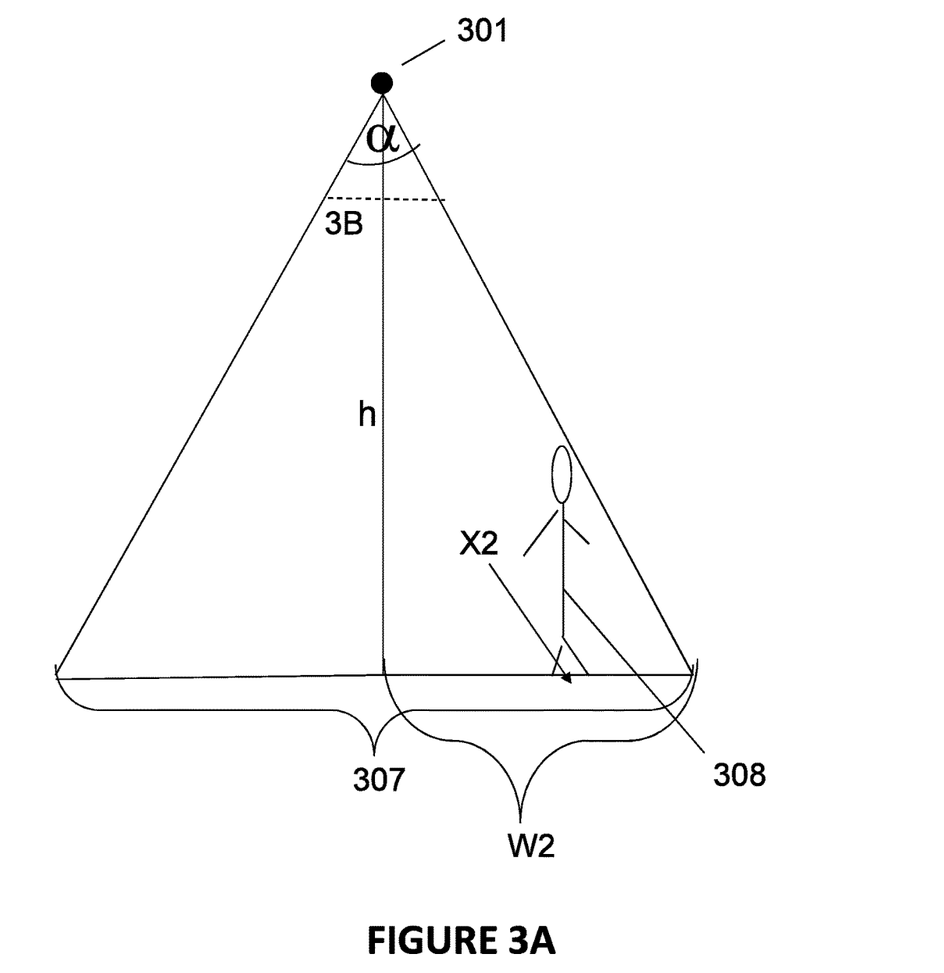
FIGS. 3A and 3B schematically illustrate a method for determining the location of an occupant on the floor of the space in an image, according to an embodiment of the invention.
Figure 3B:
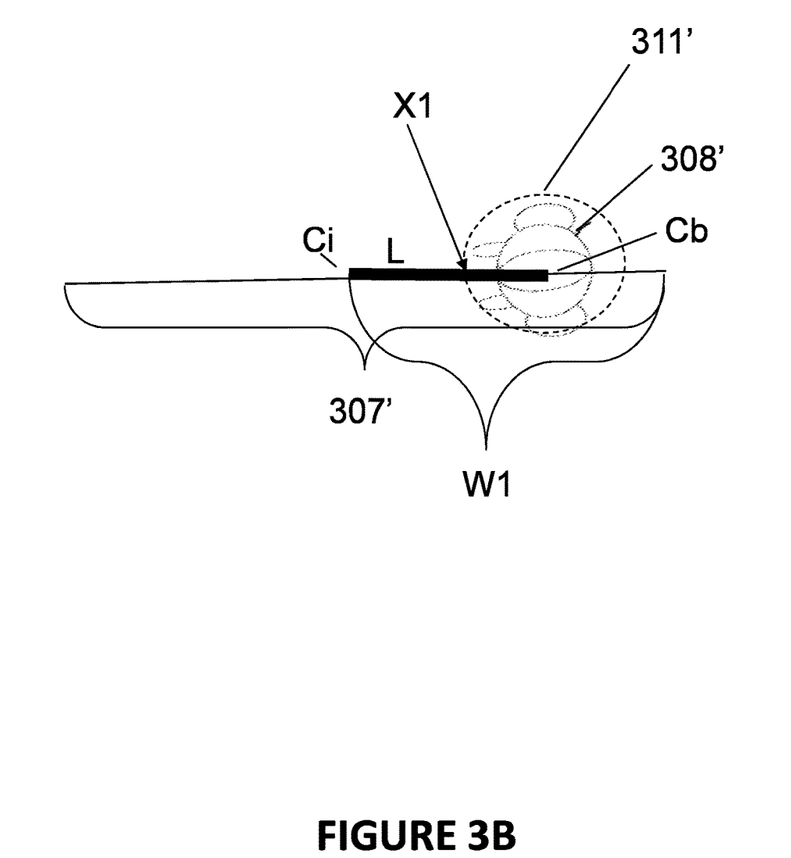

In some embodiments processor 102 may use an outline of the shape of the occupant (e.g., by creating a bounding shape around the shape of the occupant) to create descriptors of the occupant 105, as further exemplified in reference to FIG. 3B.

Figure 2:
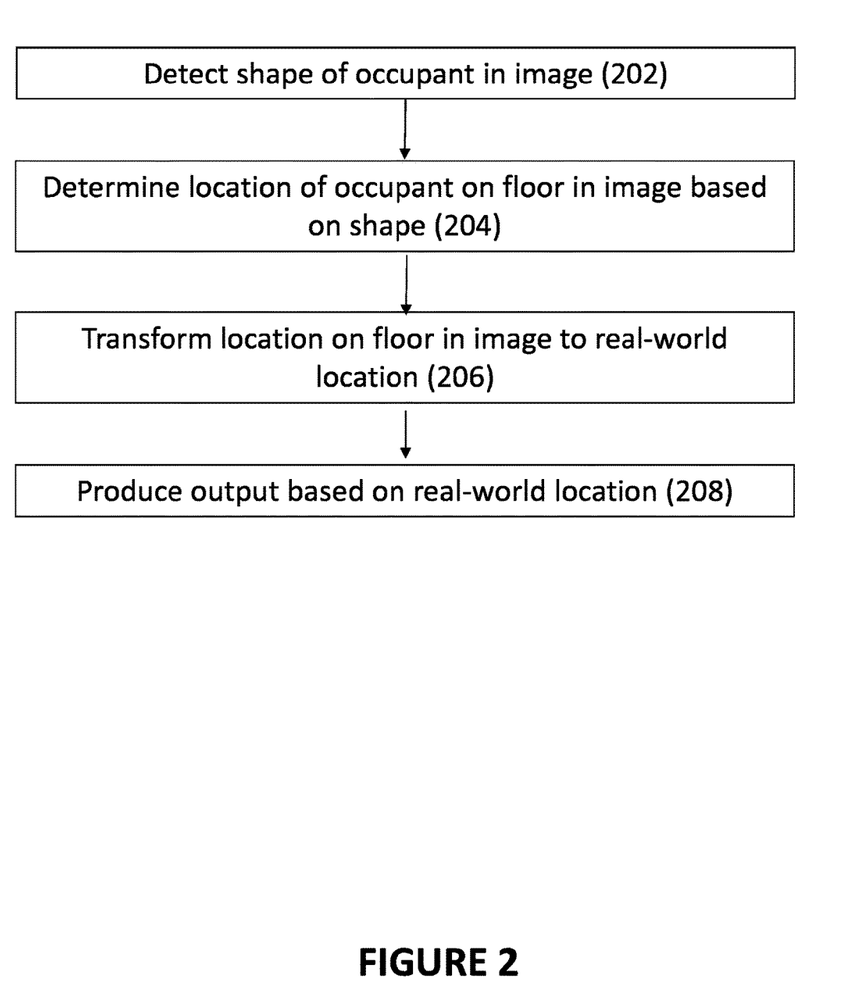
FIG. 2 is a schematic illustration of a method for determining a location of an occupant in a space, according to an embodiment of the invention.

In one embodiment, which is schematically illustrated in FIG. 2, a method for determining a location of an occupant in a space includes detecting a shape of an occupant in an image of a space (202) and determining a location of the occupant on a floor of the space in the image, based on the shape of the occupant (204). The location on the floor in the image is then transformed to a real-world location (206) and an output (e.g., a signal) is produced based the real-world location (208).

In one embodiment the image of the space is a 2D image and the shape of the occupant is a 2D shape. In another embodiment the image of the space is a 2D image but the shape of the occupant may be a 3D shape (e.g., a 3D shape constructed from a 2D image).

In one embodiment the real-world location of an occupant is used to determine an accurate location of a person on the floor of a given space or area. The accurate location of a person may be used in a variety of applications. For example, a signal based on the real-world location can be output as a display of a number of occupants or as a signal or other output to be used in analysis of the space (e.g., to determine occupancy at specific sites within the space) or as a signal or output to control a device such as an electronic device. An electronic device may include lighting and HVAC (heating, ventilating, and air conditioning) devices or other environment comfort devices which may be controlled, such as activated or modulated, based on output of the real-world location, namely based on the accurate location of an occupant on the floor of the monitored space. Other examples of electronic devices may include devices with displays wherein an output of the real-world location may control the display (e.g., may cause a change on a graphical user interface of the display).

In one embodiment determining the location of the occupant on the floor of the space in the image includes identifying feet of the occupant using shape detection methods, e.g., based on the shape of the occupant, and determining the location of the occupant on the floor of the space in the image based on the identified feet, e.g., by determining that the location of the feet of the occupant in the image is the location of the occupant on the floor in the image.

In some embodiments determining the location of the occupant on the floor of the space in the image includes determining a projection of the center of mass of the occupant (based on the shape of the occupant in the image) to a location on the floor in the image.

In some embodiments a location on the floor of the projection of the center of mass of the occupant, e.g., as extracted from the occupant's shape in the image, may be given as a learning example to a machine learning process such that the system may identify locations on the floor of the projections of the center of mass of occupants based on shapes of occupants in future images.

In other embodiments the method includes creating a bounding shape around the shape of the occupant and determining the location of the occupant on the floor in the image based on the bounding shape.

Typically, the image of the space includes at least part of the floor of the space. In some cases an image sensor (typically as part of a camera) is placed at a known distance from the floor of the space to obtain the image of the space (and at least part of the floor of the space, e.g., if the camera is configured to obtain a top view of the space) and the location of the occupant on a floor of the space in the image may be determined using the known distance of the image sensor or camera from the floor. Some embodiments are exemplified in FIGS. 3A and 3B.

FIG. 3A schematically illustrates a real-world situation in which a camera 301 is located on a ceiling of a space. The camera 301 is very small in relation to the space and thus may be treated as a pinhole. The field of view (FOV) of the camera 301 includes floor 307 (or part of floor 307) and occupant 308 (or part of occupant 308). The image plane of the camera 301 is schematically shown as line 3B.

FIG. 3B schematically illustrates the image plane of the camera 301 (an enlargement of line 3B from FIG. 3A). In FIG. 3B the occupant 308 and floor 307 in the real-world are schematically illustrated as occupant 308' (as viewed from above) and floor 307' in the image plane of the camera 301. A processor (such as processor 102) may create on the image plane a bounding shape 311' (e.g., rectangle or ellipse) around the shape of the occupant 308'. A line L is then virtually drawn from the center point Cb of the bounding shape 311' to the center point Ci of the image plane. Point X1, which is the point of transection of line L with the bounding shape 311' outline, is the location of the occupant 308' on the floor 307' in the image.

Referring back to FIG. 3A the real-world location of the occupant 308 on the floor 307 (namely the location of the occupant on the floor in the space) is marked as point X2. The length of half of the floor 307 visible in the camera 301 FOV is designated W2. W2 is known from the given camera angle α and known distance h of the camera 301 from the floor 307. In FIG. 3B the width of half the image frame is designated W1.

Transforming the location of the occupant on the floor in the image (X1) to a real-world location (X2) can be calculated using the formula:

$$X2/X1 = W2/W1$$

In one embodiment the bounding shape 311' (or an otherwise calculated outline of the shape of the occupant) may be used to create descriptors of occupant 105. For example, rays from the outline of bounding shape 311' to point Ci may be used as descriptors of occupant 105. In a multi-sensor setup (e.g., as described in FIG. 1B) lines or rays may be calculated in each of the images obtained by the different image sensors (e.g., 103*a* and 103*b*) from the outline of the shape of the occupant in each image to the center point of the image plane of each of the images. The different images may then be aligned (using the known distance of the image sensors from each other and the known distances of the image sensors from the floor) and the points of intersection of the rays from the different images can be used to match the two images. For example, matching above a certain threshold results in the determination that the object in both images is the same object, indicating that there is only one occupant 105 in the space.

Figure 4:
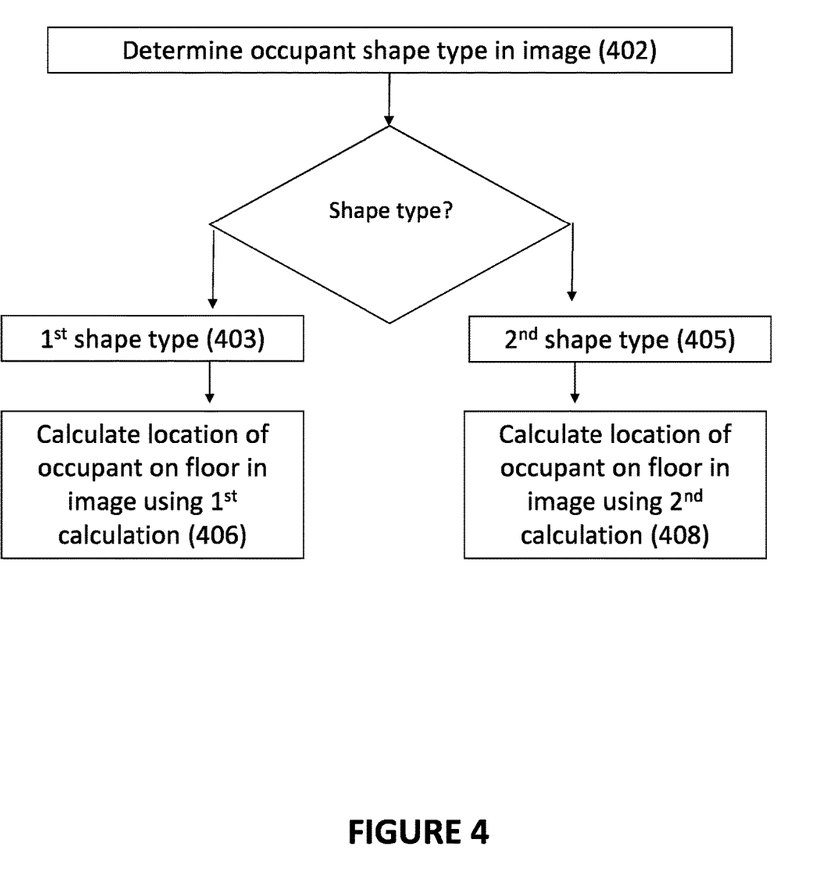
FIG. 4 schematically illustrates a method for determining the location of an occupant on the floor in an image based on different types of shapes, according to embodiments of the invention.

In one embodiment different methods or calculations are used to determine the location of the occupant on the floor in the image for different types of shapes of occupants. In one embodiment different types of shapes represent different body positions of occupants, e.g., a standing occupant vs. a reclining or sitting occupant. In one example, which is schematically illustrated in FIG. 4, a shape type of an occupant in the image is determined (402). If the shape type is a first type of shape (403) (e.g., a shape of a standing occupant) then a first method of calculation is used (406) to determine the location of the occupant on the floor in the image. If the shape type is a second type of shape (405) (e.g., a shape of an occupant sitting or reclining) then a second method of calculation is used (408) to determine the location of the occupant on the floor in the image.

For example, if the shape type of the occupant in the image is determined to be a shape type of a sitting occupant the point X1 (in FIG. 3B) will be calculated on line L but not at the transection point of the line L with the bounding shape 311' but rather closer to point Cb, to accommodate the fact that the projection of the center of mass of a sitting person will not fall above the sitting person's feet but rather closer to the middle of the person.

Thus, in one example, a first method may be used to determine the location of the occupant on a floor of the space in the image, based on a shape type of a standing occupant and a second method may be used to determine the location of the occupant based on a shape type of a sitting or reclining occupant.

In some cases an occupant may be partially obscured (e.g., in the case of a sitting occupant being imaged from a top view, the occupant's feet may be obscured by a chair or desk). In this case, the bounding shape created around the shape of the occupant (e.g., a sitting occupant) may be larger than the shape of the occupant visible to the camera. Thus, in some embodiments determining the shape of an occupant in an image may include determining if the occupant is partially obscured. In one embodiment a bounding shape created around the occupant's shape is based on this determination.

Determining the shape of an occupant in an image may also include detecting one or more objects, in addition to the occupant, in the image. In one example, determining a shape of a sitting occupant may include detecting a desk or chair (e.g., by detecting a shape of the desk or chair, or by other object detection methods) near a shape of a partially obscured occupant.

Figure 5A:
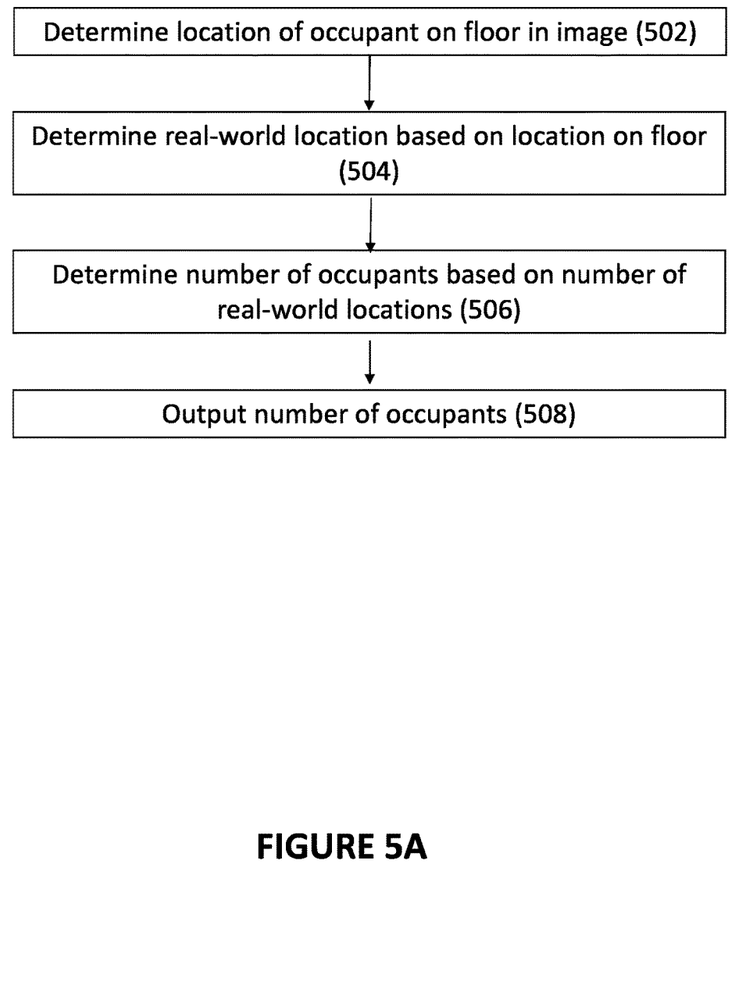
FIGS. 5A and 5B schematically illustrate methods for determining a number of occupants in a space, according to embodiments of the invention.

In one embodiment there is provided a method for determining a number of occupants in a space. One embodiment of the method is schematically illustrated in FIG. 5A.

A location of an occupant on a floor of a space in a 2D image of the space is determined (502). A real-world location is determined based on the location on the floor in the image (504) and a number of occupants in the space is determined based on the number of different real world locations determined (506), e.g., based on the number of different real-world coordinates. The method may further include outputting the number of occupants (508), e.g., for analysis or control of devices as described above.

In one embodiment determining the location of an occupant on a floor in an image is based on a shape of the occupant in the image, for example, as described above (e.g., with reference to FIGS. 2, 3A and 3B).

In another embodiment a number of occupants in a space may be determined by matching images from two different image sensors or descriptors of objects (e.g., shapes of objects) from two different images.

Figure 5B:
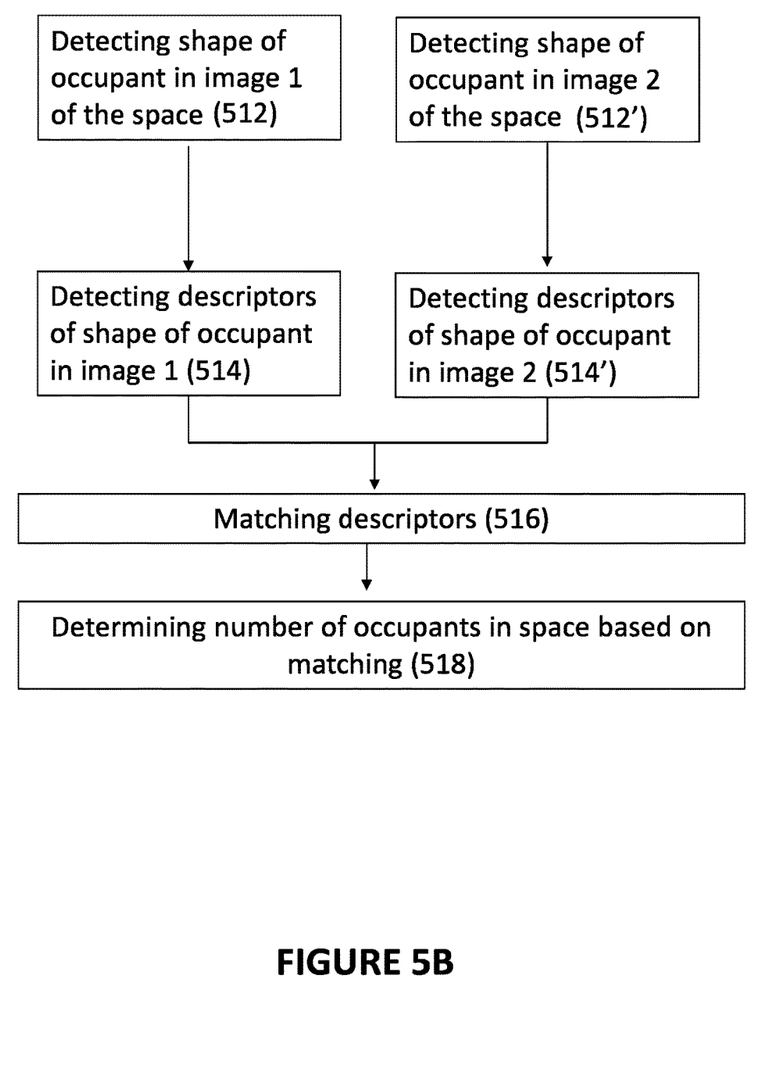

In one embodiment, which is schematically illustrated in FIG. 5B, determining a number of objects or occupants in a space may include detecting a shape of an object or occupant in a plurality (e.g., two) of different images of a space; detecting a shape of occupant in a first image of the space (512) and detecting a shape of an occupant in a second image of the space (512'). In each of the different images descriptors of the shape are detected; descriptors of the shape of occupant in the first image are detected (514) and descriptors of the shape of occupant in the second image are detected (514'). The descriptors are then matched (516). Determining the number of objects or occupants in the space (518) is based on the matching. For example, the matching (e.g., matching above or below a predetermined threshold) may be used to determine if two objects or occupants or parts of objects or occupants seen in two or more different images of the space represent the same object or occupant, enabling to remove redundancies and provide more accurate counting of objects and occupants.

Figure 6:
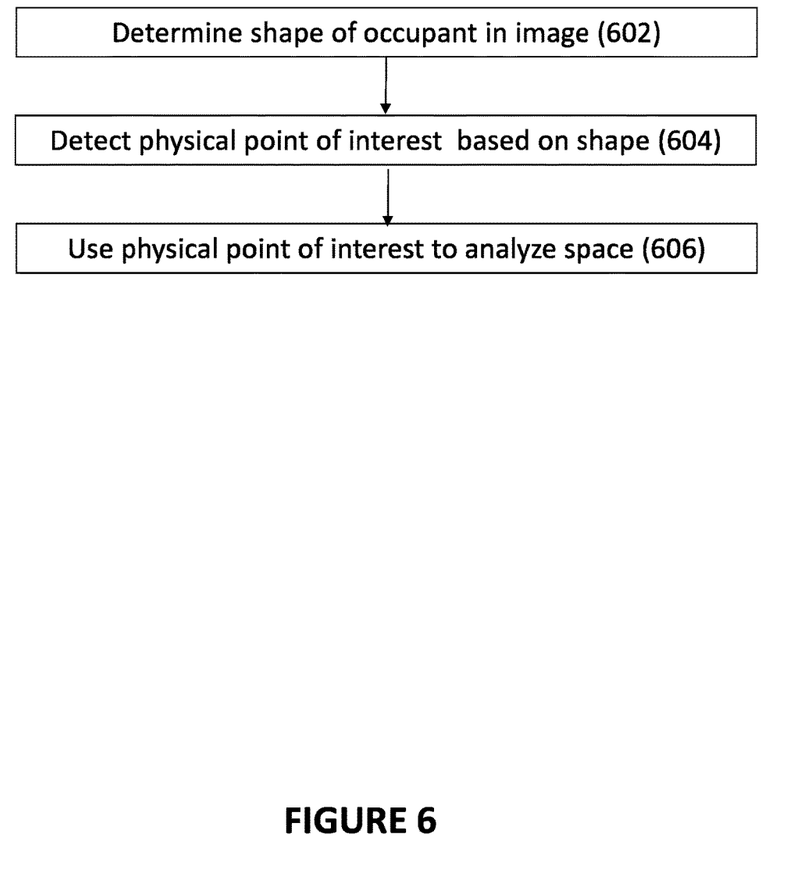
FIG. 6 is a schematic illustration of a method for analyzing a space based on detection of a physical point of interest related to an occupant in a 2D image, according to embodiments of the invention.

In some embodiments a physical point of interest related to an occupant, the point determined from a 2D image of a space, can be used in analysis of the space. In one embodiment, which is schematically illustrated in FIG. 6, a shape of an occupant is determined in an image of a space (e.g., a 2D image of the space) (602) and a physical point of interest is detected based on the determined shape (604). The physical point of interest is then used to analyze the space (606).

In one example the physical point of interest is the location of the occupant on the floor of the space in the image, as described above. In another example the physical point of interest may be a point related to the occupant's shape, for example, the tip of the occupant's nose or the occupant's shoulders. Information such as the direction of the occupant's gaze, may be learned from the physical point of interest.

Thus, in one embodiment the physical point of interest may be a point related to the occupant's face or posture. For example, the tip of the occupant's nose may be detected based on shape detection (e.g., detection of the shape of the occupant or detecting a shape of a nose). In another example the occupant's shoulders may be detected based on shape detection (e.g., detection of the shape of the occupant or detecting a shape of shoulders). The direction of the tip of the nose or of the shoulders may indicate, for example, the direction of the occupant's gaze. Information regarding the direction the occupant's gaze may be used, for example, to analyze customers' behavior in a store and/or other crowd analysis parameters.

Systems and methods according to embodiments of the invention enable analysis of a space from a 2D image, thus enabling the use of typically inexpensive 2D cameras for occupancy determination and space analysis.

What is claimed is:

1. A method for determining a location of an occupant in a space, the method comprising:
    detecting a shape of an occupant in an image of a space;
    using a first calculation to determine a location of the occupant on a floor in the image when the shape of the occupant is a first shape type;
    using a second calculation to determine the location of the occupant on the floor in the image when the shape of the occupant is a second shape type;
    transforming the location on the floor in the image to a real world location; and
    outputting a signal based on the real world location.

2. The method of claim 1 wherein using the first calculation to determine the location of the occupant on the floor of the space in the image comprises determining a projection of the center of mass of the occupant in the image to a location on the floor in the image.

3. The method of claim 1 and further comprising determining the location of the occupant on the floor in the image based on a bounding shape around the shape of the occupant.

4. The method of claim 1 and further comprising identifying feet of the occupant based on the shape of the occupant; and determining the location of the occupant on the floor of the space in the image based on the identified feet.

5. The method of claim 1 wherein the first shape type comprises a standing occupant and the second shape type comprises a sitting or reclining occupant.

6. The method of claim 1 wherein detecting the shape of the occupant comprises determining if the occupant is partially obscured.

7. The method of claim 1 wherein detecting the shape of the occupant comprises detecting an object, in addition to the occupant, in the image.

8. The method of claim 1 wherein the image is a 2D image.

9. The method of claim 1 wherein the image comprises at least part of the floor of the space.

10. The method of claim 1 and further comprising determining a number of occupants in the space based on a number of real-world locations.

11. The method of claim 1 and further comprising:
    detecting, in each of a plurality of images of the space, descriptors of the shape of the occupant;
    matching the descriptors from the plurality of images; and
    determining a number of occupants in the space based on the matching.

* * * * *